(12) United States Patent
Kwatra et al.

(10) Patent No.: US 8,965,124 B1
(45) Date of Patent: *Feb. 24, 2015

(54) SPATIO-TEMPORAL SEGMENTATION FOR VIDEO

(71) Applicant: Google Inc., Mountain View, CA (US)

(72) Inventors: Vivek Kwatra, Santa Clara, CA (US); Mei Han, Palo Alto, CA (US); Matthias Grundmann, Atlanta, GA (US)

(73) Assignee: Google Inc., Mountain View, CA (US)

( * ) Notice: Subject to any disclaimer, the term of this patent is extended or adjusted under 35 U.S.C. 154(b) by 59 days.

This patent is subject to a terminal disclaimer.

(21) Appl. No.: 13/972,806

(22) Filed: Aug. 21, 2013

Related U.S. Application Data (63) Continuation of application No. 12/496,599, filed on Jul. 1, 2009, now Pat. No. 8,620,077.

(60) Provisional application No. 61/147,441, filed on Jan. 26, 2009.

(51) Int. Cl.
*G06K 9/34* (2006.01)
*H04N 5/91* (2006.01)

(52) U.S. Cl.
CPC ....................................... *H04N 5/91* (2013.01)
USPC ........................................... 382/173; 382/163

(58) Field of Classification Search
None
See application file for complete search history.

(56) References Cited

U.S. PATENT DOCUMENTS

| 6,856,757 | B2 * | 2/2005 | Dagtas | 386/227 |
| 6,859,554 | B2 * | 2/2005 | Porikli et al. | 382/173 |
| 7,397,948 | B1 * | 7/2008 | Cohen et al. | 382/167 |
| 2002/0051010 | A1 * | 5/2002 | Jun et al. | 345/723 |
| 2002/0136528 | A1 * | 9/2002 | Dagtas | 386/46 |
| 2002/0176625 | A1 * | 11/2002 | Porikli et al. | 382/173 |

FOREIGN PATENT DOCUMENTS

WO   WO 2011/119775 A1   9/2011

OTHER PUBLICATIONS

Anderson, R., A local algorithm for finding dense subgraphs, In Proc. 19th Annual ACM-SIAM Symposium on Discrete Algorithms, 2008, pp. 1003-1009.
Blum, A. et al., "Combining labeled and unlabeled data with co-training," In Proc. 11th Annual Conference on Computational Learning Theory, COLT, Jul. 1998, pp. 92-100.
Davison, B. D., "Topical locality in the web," In Proc. 23rd Annual International ACM SIGIR Conference on Research and Development in Information Retrieval, 2004, pp. 272-279.
Dekel, O., et al., "Large margin hierarchical classification," Proceedings of the 21 st International Conference on Machine Learning, Banff, Canada, 2004, 8 pages.

(Continued)

*Primary Examiner* — Sean Motsinger
(74) *Attorney, Agent, or Firm* — Fenwick & West LLP (57) ABSTRACT

A video is segmented to produce volumetric video regions. Descriptors are created for the video regions. A region graph is created for the video, where the region graph has weighted edges incident to video regions and the weight of an edge is calculated responsive to the descriptors of the video regions incident to the edge. The region graph is segmented responsive to the weights of the edges incident to the video regions to produce a new region graph having new volumetric video regions comprised of merged video regions of the first region graph. The descriptions of the region graphs are stored in a data storage.

20 Claims, 5 Drawing Sheets

(56) References Cited

OTHER PUBLICATIONS

Deng, J., et al., "ImageNet: A Large-Scale Hierarchical Image Database," IEEE Computer Society Conference on Computer Vision and Pattern Recognition, Jun. 22, 2009, pp. 248-255.

Dumais, S., et al., "Hierarchical classification of web content," In SIGIR '00: Proceedings of the $23^{rd}$ annual international ACM SIGIR conference on Research and development in information retrieval, pp. 256-263, New York, NY, USA, 2000. ACM.

Fan, R.-E., et al., "Liblinear: A library for large linear classification," Journal of Machine Learning Research, 2008, 1871-1874, vol. 9.

Freund, Y., et al., "A decision-theoretic generalization of on-line learning and an application to Boosting," Journal of Computer and System Sciences, 1997, pp. 119-139, vol. 55, article No. SS971504.

Goldman, S., et al., "Enhancing supervised learning with unlabeled data," In Proc. $17^{th}$ International Conference on Machine Learning, 2000, pp. 327-334.

Guillaumin, M., et al., "Multimodal semi-supervised learning for image classification," In Proc. IEEE Conf. Computer Vision and Pattern Recognition, Jun. 2010, pp. 902-909.

Gupta, S., et al., "Watch, listen & learn: Co-training on captioned images and videos," In Proc. ECML PKDD, 2008, Part I, LNAI 5211, pp. 457-472.

Halevy, A., et al., "The unreasonable effectiveness of data," Intelligent Systems, IEEE, Mar. 2009, pp. 8-12, vol. 24, No. 2.

Huang, J., et al., "Exploring web scale language models for search query processing," In Proc. 19th international conference on World wide web, Apr. 26-30, 2010, pp. 451-460.

Koller, D., et al., "Hierarchically classifying documents using very few words," In the Proceedings of the Fourteenth International Conference on Machine Learning, ICML, Jul. 8-12, 1997, pp. 170-178.

Li, L.-J., et al., "Towards total scene understanding: Classification, annotation and segmentation in an automatic framework," In Proc. IEEE Conf. Computer Vision and Pattern Recognition, 2009, pp. 2036-2043.

Li, L.-J., et al., "Optimol: automatic object picture collection via incremental model learning," In Proc. IEEE Conf. Computer Vision and Pattern Recognition, 2007, 8 Pages.

Liu, T.-Y., et al., "Support vector machines classification with a very large-scale taxonomy," in SIGKDD Explorations, 2005, pp. 36-43, vol. 7, Issue 1.

Mahajan, D., et al., "Image classification using the web graph," In Proc. Multimedia, Oct. 25-29, 2010, pp. 991-994.

Moscheni, F., et al. "Robust Region Merging for Spatio-Temporal Segmentation" IEEE International Conference on Image Processing, 1996, pp. 501-504.

Neapolitan, R. E., et al., "Learning Bayesian Networks," Prentice-Hall, Inc., Upper Saddle River, NJ, USA, 2003, Cover page and Table of Contents, 7 Pages.

Niebles, J. C., et al., "Extracting moving people from internet videos," in ECCV '08: Proceedings of the 10th European Conference on Computer Vision, 2008, pp. 527-540, Part IV, LNCS 5305.

Schapire, R. E., "The boosting approach to machine learning: An overview," In MSRI Workshop on Non-linear Estimation and Classification, 2002, pp. 1-23.

Schindler, G., et al., Internet video category recognition. In Proc. First IEEE Workshop on Internet Vision, in CVPR, 2008, pp. 1-7.

Song, Y., et al., "Taxonomic classification for web-based videos," In Proc. IEEE Conf. Computer Vision and Pattern Recognition, Jun. 2010, pp. 871-878.

Stawiaski, J., et al., "Region Merging Via Graph Cuts," Image Analysis and Stereology, Mar. 1, 2008, pp. 39-45.

Sun, A., et al., "Hierarchical text classification and evaluation," In ICDM, 2001, pp. 521-528.

Tang, L., et al., "Large scale multi-label classification via metalabeler," In Proc. $18^{th}$ International Conference on World Wide Web, Apr. 20-24, 2009, pp. 211-220.

Wang, Z., et al., "Youtubecat: Learning to categorize wild web videos," In Proc. IEEE Conf. Computer Vision and Pattern Recognition, Jun. 2010, pp. 879-886.

Zanetti, S., et al., "A walk through the web's video clips," In Proc. First IEEE Workshop on Internet Vision, in CVPR, 2008, 8 pages.

Zhu, X., Semi-supervised learning literature survey. In Tech Report. University of Wisconsin—Madison, Jul. 2008, pp. 1-60.

Felzenszwalb, P., "Efficient Graph-Based Image Segmentation," International Journal of Computer Vision, Sep. 2004, 26 Pages.

Friedman, N., et al., "Image segmentation in video sequences: A probabilistic approach," University of California, Berkeley, 1997, 13 Pages.

Shi, J., et al., "Normalized Cuts and Image Segmentation," IEEE Transactions on Pattern Analysis And Machine Intelligence, Aug. 2000, pp. 888-905, vol. 22, No. 8.

Yoon, S., et al., "Region-Based Video Coding Using A Multiscale Image Segmentation," In Proceedings of 1997 International Conference on Image Processing (ICIP '97), 1997, 4 Pages.

Office Action for U.S. Appl. No. 12/496,599 mailed on Sep. 21, 2012, 13 Pages.

\* cited by examiner

SPATIO-TEMPORAL SEGMENTATION FOR VIDEO

CROSS-REFERENCE TO RELATED APPLICATION

This application is a continuation of U.S. application Ser. No. 12/496,599, filed Jul. 1, 2009, which claims the benefit of U.S. Provisional Application No. 61/147,441, filed Jan. 26, 2009, both of which are incorporated herein by reference in their entirety.

BACKGROUND

1. Field of the Invention

This invention generally relates to manipulating video content and more specifically to performing spatio-temporal segmentation of video content.

2. Description of the Related Art

The sharing of video content on websites has developed into a worldwide phenomenon, supported by dozens of websites. Many thousands of videos are posted every day, and this number is increasing as the tools and opportunities for capturing video become easier to use and more widespread. Millions of people watch the posted videos.

There is often a need to process the posted videos in order to support the various functions of the sharing websites. This processing can involve resizing the videos, compressing the videos, detecting objects within the videos, detecting images within the videos, etc. Certain types of processing can benefit from treating different regions of a video differently. For example, a resizing process can resize only certain regions of the video while leaving other regions at their native sizes. Likewise, a compression process can allocate a greater amount of data to important regions while providing fewer data to less important regions.

Thus, websites seek ways to segment videos into different regions in order to provide the ability to apply different processing to the different regions. Generally, the video should be segmented into regions of similar appearance. For example, black bars surrounding a letterboxed video can form a region, and objects within the video, such as grass, sky, or hair can also form separate regions. While image segmentation techniques exist, such techniques tend to perform poorly when applied in the video domain due to the lack of temporal coherence. Therefore, there is a need for a way to perform video segmentation.

SUMMARY

The above and other needs are met by a method, computer, and computer-readable medium storing executable computer program instructions for segmenting a video. An embodiment of the method uses a computer to segment a video and comprises segmenting the video to produce volumetric video regions and creating descriptors for the video regions. The method further comprises generating a first region graph for the video, where the first region graph has weighted edges incident to video regions and the weight of an edge is calculated responsive to the descriptors of the video regions incident to the edge. The method additionally comprises segmenting the first region graph responsive to the weights of the edges incident to the video regions to produce a second region graph having new volumetric video regions comprised of merged video regions of the first region graph and storing descriptions of the first and second region graphs in a data storage.

An embodiment of the computer comprises a computer-readable storage medium storing executable computer program instructions. The instructions comprise instructions for segmenting the video to produce volumetric video regions, creating descriptors for the video regions, and generating a first region graph for the video, where the first region graph has weighted edges incident to video regions and the weight of an edge is calculated responsive to the descriptors of the video regions incident to the edge. The instructions further comprise instructions for segmenting the first region graph responsive to the weights of the edges incident to the video regions to produce a second region graph having new volumetric video regions comprised of merged video regions of the first region graph and storing descriptions of the first and second region graphs in a data storage. The computer further comprises a processor configured to execute the computer program instructions stored on the computer-readable storage medium.

An embodiment of the computer-readable storage medium stores executable computer program instructions comprising instructions for segmenting the video to produce volumetric video regions, creating descriptors for the video regions, and generating a first region graph for the video, where the first region graph has weighted edges incident to video regions and the weight of an edge is calculated responsive to the descriptors of the video regions incident to the edge. The instructions further comprise instructions for segmenting the first region graph responsive to the weights of the edges incident to the video regions to produce a second region graph having new volumetric video regions comprised of merged video regions of the first region graph and storing descriptions of the first and second region graphs in a data storage.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
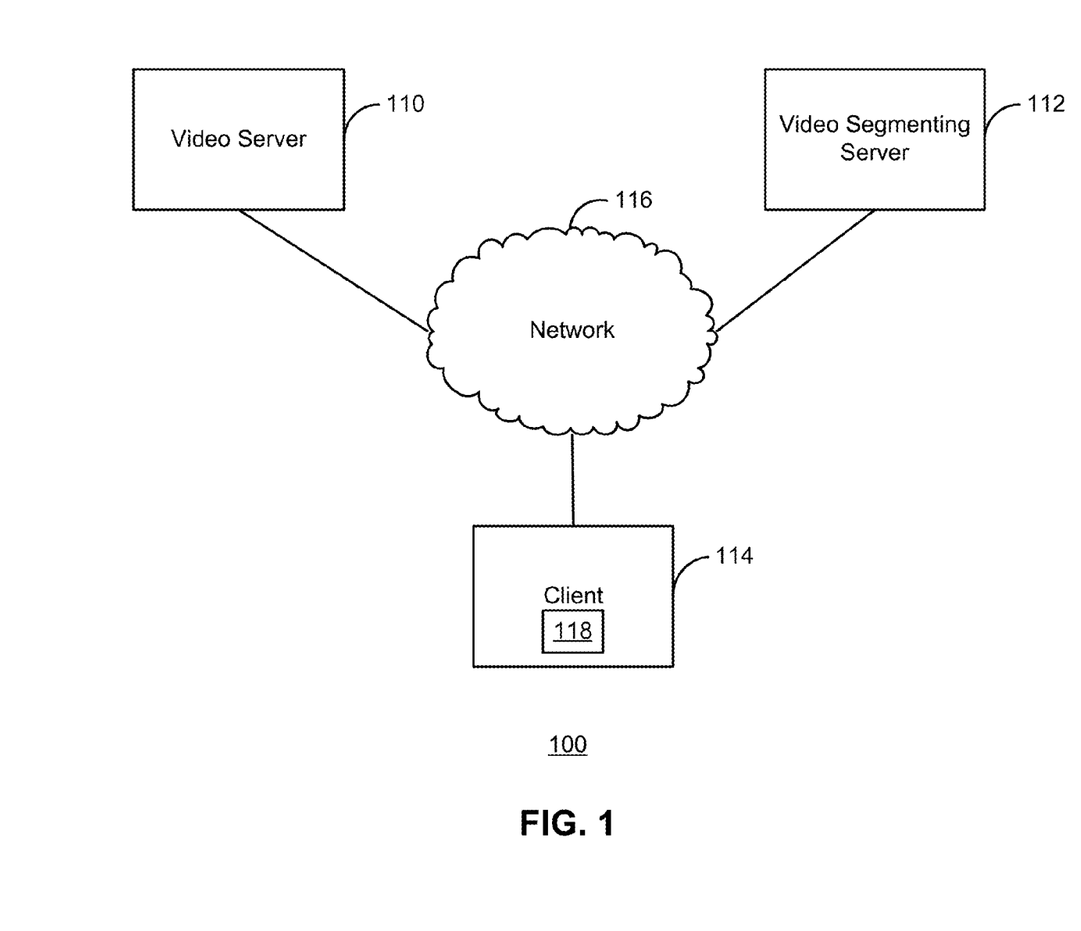
FIG. 1 is a high-level block diagram of a computing environment according to one embodiment.

FIG. 1 is a high-level block diagram of a computing environment 100 according to one embodiment. FIG. 1 illustrates a video server 110, a video segmenting server 112 (the "segmenting server") and a client 114 connected by a network 116. Only one client 114 is shown in FIG. 1 in order to simplify and clarify the description. Embodiments of the computing environment 100 can have thousands or millions of clients 114, as well as multiple video 110 and segmenting servers 112.

The video server 110 serves video content (referred to herein as "videos") to clients 114 via the network 116. In one embodiment, the video server 110 is located at a website provided by YOUTUBE, LLC of San Bruno, Calif., although the video server can also be provided by another entity. The video server 110 includes a database storing multiple videos and a web server for interacting with clients 114. The video server 110 receives requests from users of clients 114 for the videos in the database and serves the videos in response. In addition, the video server 110 can receive, store, and serve videos posted by users of the clients 114 and by other entities.

The segmenting server 112 segments videos stored by the video server 110 into spatio-temporal regions. Generally, the segmenting server 112 segments a video into regions (i.e., groups of pixels) of similar appearance. Similarity is based on color difference in one embodiment but also accounts for color variation within a region. For example, a region of homogeneous color will remain distinct from a region having pixels of a different color. But an inherently noisy region, e.g. a region that originates from an image of a natural scene like grass and water, can also exist.

In one embodiment, the segmenting server 112 generates a hierarchical segmentation of the video. The higher levels of the hierarchy describe relatively coarse segmentations of the video while lower levels of the hierarchy describe relatively fine segmentations of the video. The segmenting server 112 stores the hierarchical segmentation in a manner that allows the segmentation at a particular level of the hierarchy to be selected.

The segmentations produced by the segmenting server 112 can be used to support subsequent processing of the videos. The subsequent processing can be performed by the segmenting server 112, the video server 110, and/or by other entities on the network 116. The processing can include, for example, resizing, compressing, object detection, and image detection. These types of processing can apply different policies, e.g., different types of compression, to different regions. Moreover, an administrator and/or an automated process can select a level of segmentation from the segmentation hierarchy to use with the processing. The processed videos can be stored and served by the video server 110.

The client 114 is a computer or other electronic device used by one or more users to perform activities including viewing videos and other content received from the video server 110. The client 114, for example, can be a personal computer executing a web browser 118 that allows the user to browse and search for videos available at the video server web site. In other embodiments, the client 114 is a network-capable device other than a computer, such as a personal digital assistant (PDA), a mobile telephone, a pager, a television "set-top box," etc.

The network 116 enables communications among the entities connected to it. In one embodiment, the network 116 is the Internet and uses standard communications technologies and/or protocols. Thus, the network 116 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 116 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 116 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

Figure 2:
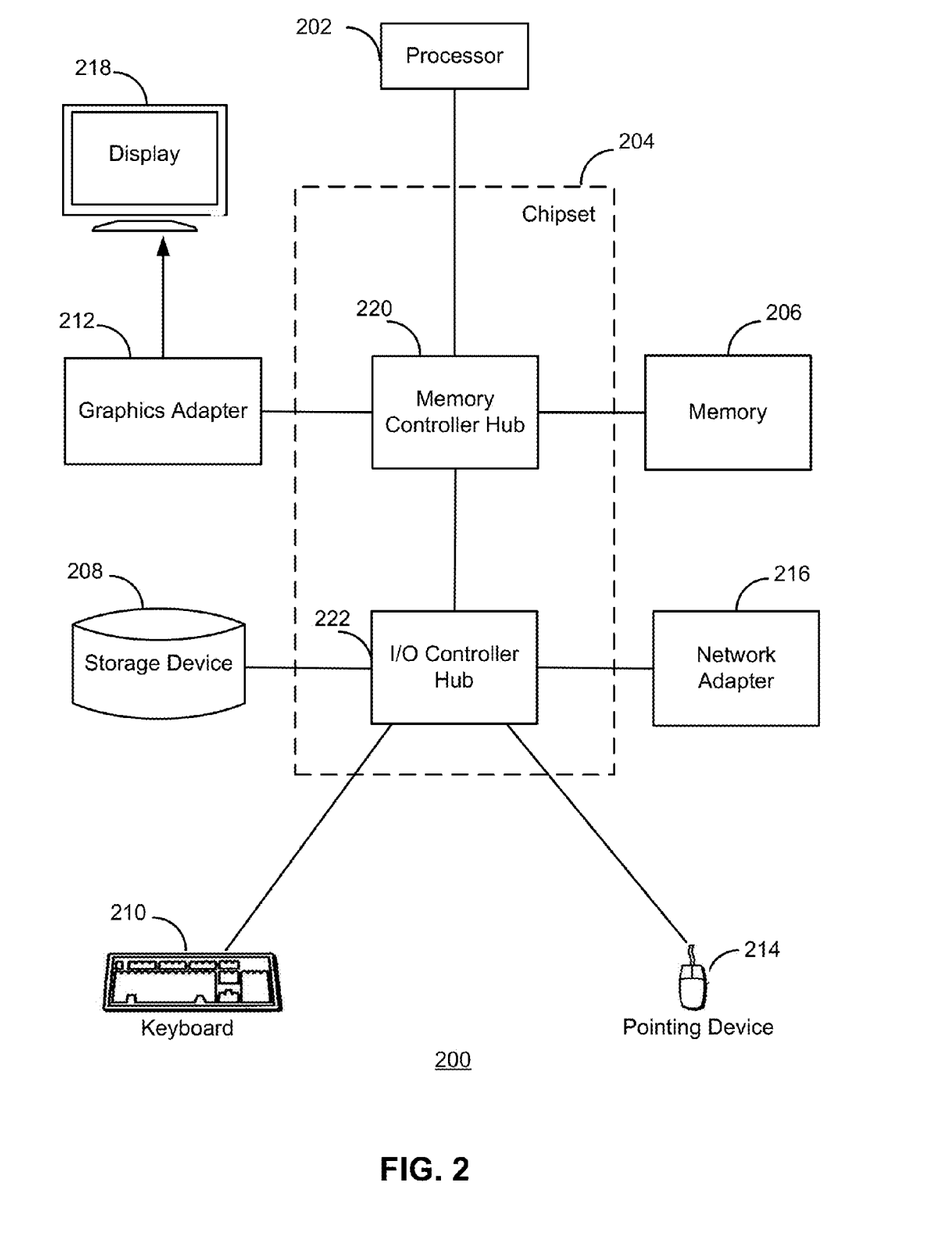
FIG. 2 is a high-level block diagram illustrating an example of a computer for use as a video server, segmenting server, and/or client.

FIG. 2 is a high-level block diagram illustrating an example of a computer 200 for use as a video server 110, segmenting server 112, and/or client 114. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 is a computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display device 218. The network adapter 216 couples the computer system 200 to the network 116. Some embodiments of the computer 200 have different and/or other components than those shown in FIG. 2.

The computer 200 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

The types of computers 200 used by the entities of FIG. 1 can vary depending upon the embodiment and the processing power used by the entity. For example, a client 114 that is a mobile telephone typically has limited processing power, a small display 218, and might lack a pointing device 214. The segmenting server 112, in contrast, may comprise multiple blade servers working together to provide the functionality described herein.

Figure 3:
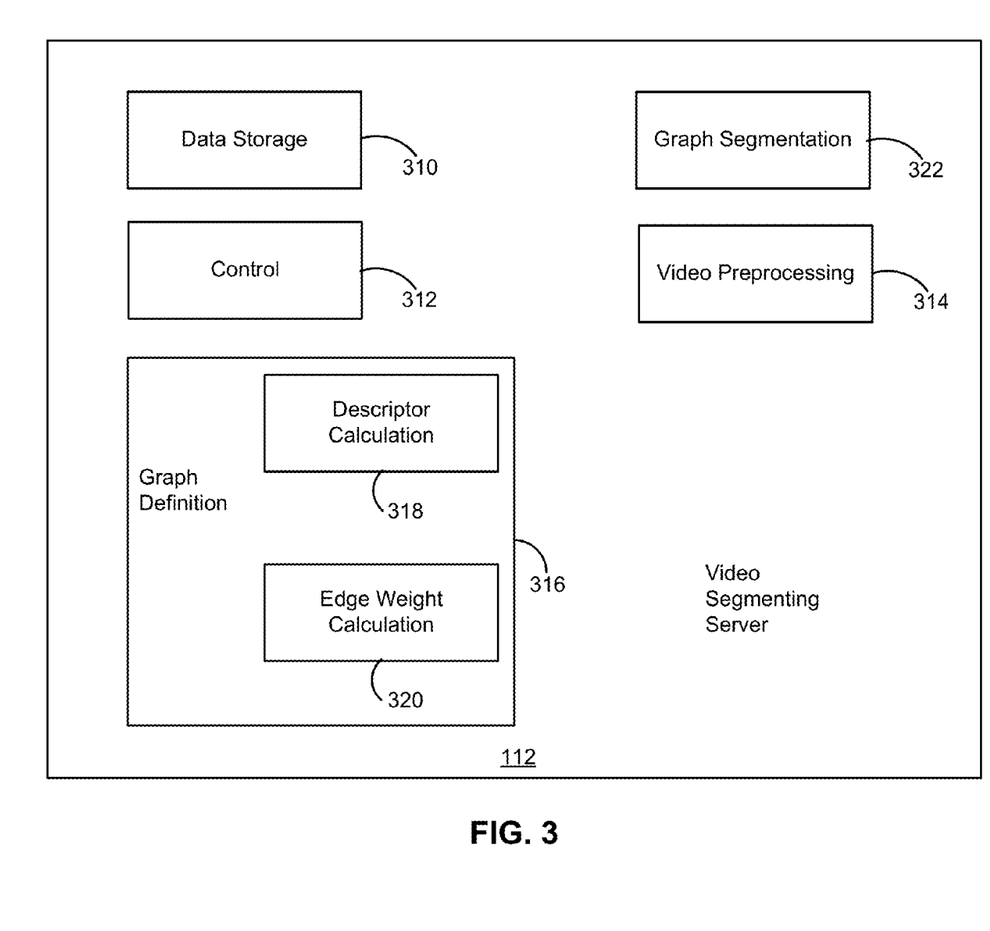
FIG. 3 is a high-level block diagram illustrating modules within the segmenting server according to one embodiment.

FIG. 3 is a high-level block diagram illustrating modules within the segmenting server 112 according to one embodiment. Some embodiments of the segmenting server 112 have different and/or additional modules than the ones described here. Similarly, the functions can be distributed among the modules in a different manner than is described here. Certain modules and functions can be incorporated into other modules of the segmenting server 112 and/or other entities on the network 116, including the video server 110 and client 114.

A data storage module 310 stores data used by the various modules of the segmenting server 112. The stored data include videos undergoing segmentation, frames and/or other portions of videos being operated upon, parameters related to the segmentation process, and data created during the segmentation process. These latter data include the description of the segmentation of a video. The description describes the hierarchical segmentation of the video, and the regions formed by the segmentations at various levels of the hierarchy.

A control module 312 controls the operation of the segmenting server 112. In one embodiment, an administrator of the segmenting server 112 interacts with the control module 312 to select a video for segmenting and specify the segmenting parameters. The segmenting parameters affect aspects such as the number of levels of the segmentation hierarchy and the granularity of the segmentations at the levels of the hierarchy. The control module 312 can provide a graphical user interface to an administrator for enabling these interactions.

In one embodiment, the segmenting server 112 performs segmenting via an iterative process. Each iteration produces a segmentation for a level of the hierarchy. The control module 312 controls the other modules of the segmenting server 112 to perform the specified segmenting through an appropriate number of iterations.

A video pre-processing module 314 performs any pre-processing of the video that is necessary or desired before the video is segmented. In one embodiment, the video is pre-processed to divide it into scenes. The pre-processing module 314 applies shot detection-based techniques to the video to identify different scenes contained therein, where each scene is associated with a single camera shot. A single scene of the longer video is then identified for spatio-temporal segmentation and the techniques described herein are applied to the portion of the video forming the identified scene.

The video pre-processing module 314 can also perform filtering of the video in order to improve the segmentation process. One embodiment of the video pre-processing module 314 performs bilateral filtering of the video in order to smooth the images within frames of the video while preserving edges. Such filtering can improve segmentation because it makes regions of the video more homogeneous.

A graph definition module 316 defines a graph representing the video. The graph is defined over the spatio-temporal video volume (i.e., the graph is volumetric and covers the video in both space and time). Generally, the graph describes the video as a set of nodes incident to (connected by) a set of edges. For the first iteration of the segmentation, each node contains a single pixel (i.e., a voxel). The edges of this first iteration are based on 26-neighborhood. In other words, each node of the graph has 26 edges connecting it to other nodes: 8 edges in space (i.e., within the frame of video), 9 neighbors forward in time, and 9 neighbors backward in time (excluding nodes on the edges of the video). During subsequent iterations, nodes can define volumetric regions having multiple pixels, and the number of edges for a node can decrease depending upon the segmentation. For clarity, the graph for the first iteration, when each node contains a single pixel, is referred to herein as the "segmentation graph." The graphs for subsequent iterations, where nodes can define regions, are referred to as "region graphs" and the nodes are frequently referred to as "regions."

A descriptor calculation module 318 determines a descriptor for a node of the video defined by the graph. In general, a descriptor describes the overall pixel intensity within a node. The descriptor calculation module 318 stores the descriptors in the data storage module 310.

During the first iteration, each node of the segmentation graph contains a single pixel. Thus, the descriptor calculation module 318 uses the intensity of that pixel as the descriptor for the node. During subsequent iterations, nodes of the region graph can contain multiple pixels. For these nodes, an embodiment of the descriptor calculation module 318 computes a histogram describing the colors of pixels within the region defined by the node and uses the histogram as the node's descriptor. In one embodiment, the histogram describes the red/green/blue (RGB) intensities of the pixels within the region. Other embodiments can describe the pixel intensities using histograms in other color spaces, such as the hue/saturation/value (HSV) and L*a*b* (Lab) color spaces. Generally, a homogenous region will exhibit peaks in its histogram, while noisy regions have flat, scattered histograms. The histogram is normalized to sum to one in some embodiments in order to avoid giving undue low costs to small regions. In addition, in one embodiment the color range of the image is represented using normalized values ranging from zero to one, instead of the usual values from zero to 255 (e.g., the 8-bit color of a subpixel is represented using a value normalized to the range of zero to one).

An edge weight calculation module 320 calculates weights for edges incident to nodes in the graph. Generally, the edge weight calculation module 320 calculates the edge weight based on differences between the descriptors for the two nodes incident to the edge. Since the descriptors describe overall pixel intensity within a node, the edge weight essentially represents the difference in overall pixel intensity for the two nodes incident to the edge. The edge weights are stored in the data storage module 310.

During the first iteration, when each node of the segmentation graph contains a single pixel, the edge weight calculation module 320 calculates the edge weight as the color difference between the pixels incident to the edge. During subsequent iterations, nodes of the region graph can define regions having multiple pixels and the descriptors for the nodes are histograms. For these iterations, the edge weight calculation module 320 calculates the edge weight based on the difference between the histograms. In one embodiment, the edge weight calculation module 320 calculates the edge weight as the chi-squared ($\chi^2$) distance between the two histograms of the nodes incident to the edge. As histogram bins are independent normally-distributed random variables, the $\chi^2$ distance is a measure of the "closeness" between the histograms.

In other embodiments, the descriptor calculation module 318 uses descriptors other than, or in addition to, color histograms to describe nodes of a region graph, and the edge weight calculation module 320 calculates the edge weights using measures other than, or in addition to, the $\chi^2$ distance. For example, the two modules can use a technique based on a Gaussian mixture model to produce the edge weights. In such a model, the pixels within a region defined by a node are plotted by color in a 3-dimensional graph. Then, the pixel distributions in the graph are clustered. Each cluster is represented by one or more values that describe the distribution of pixels within the cluster, such as mean and sigma values. Thus, a region of a region graph is described by a set of mean, sigma values. The edge weight calculation module 320 calculates the edge weight based on a comparison of the mean, sigma values for the regions incident to an edge. In another embodiment, the descriptor calculation module 318 computes histograms describing the image gradients within the regions. These image gradient histograms supplement the color histograms and the edge weights are also based on the $\chi^2$ distance between the image gradient histograms.

In sum, the graph definition module 316 defines a graph for a video. The graph includes nodes incident to edges. Each node has an associated descriptor describing the overall pixel intensity within the node. Each edge, in turn, has an associated weight describing the differences between the descriptors for the two nodes incident to the edge.

A graph segmentation module 322 segments a graph to produce a new graph segmented into larger regions. For the first iteration, the graph segmentation module 322 segments the initial segmentation graph of the video to produce a region graph. For subsequent iterations, the graph segmentation module 322 segments region graphs to produce new region graphs with successively larger regions. Collectively, the set of graphs produced by the graph segmentation module 322 form a hierarchy, with each level of the hierarchy having a graph with a different segmentation.

The graph segmentation module 322 performs the segmentation by determining the internal variation of the nodes, traversing the edges of the nodes in order of increasing weight, and evaluating whether the edge weight is smaller than the internal variation of both nodes incident to the edge. If the edge weight is smaller, the nodes are merged together and the internal variation of the compound node is updated to the larger of the internal variations of the two merged nodes.

In one embodiment, the internal variation Int(R) of a region R (i.e., a node) is defined as the maximum edge weight $e_{max}$ of its Minimum Spanning Tree (MST):

$$Int(R) := \max_{e \in MST of R} w(e)$$

Here, w(e) is the edge weight of edge e. The intuition is that the MST holds the region together with the lowest cost set of edges. Any other spanning set will have at least one edge with weight$\geq e_{max}$. Therefore, $e_{max}$ defines a lower bound on the maximal internal color variation of the region. In other words, Int(R) for a current node is the maximum weight of the edges incident to the nodes that were merged to form the current node.

A node having a single pixel, as is found in the initial segmentation graph, has an internal variation of zero because its MST has no edges. Therefore, no merge would ever happen using the technique described above. To resolve this issue, the internal variation used by the graph segmentation module 322 is substituted by a relaxed internal variation RInt(R) of a region R:

$$RInt(R) := Int(R) + \tau$$

The relaxed internal variation allows regions to be merged even if the weight of the edge that connects them is larger than the regions' internal variations. The value of $\tau$ affects the granularity of the segmentation, with a larger $\tau$ usually leading to larger regions.

In one embodiment, the graph segmentation module 322 performs an initial segmentation of the segmentation graph using a low value of $\tau$, e.g., a value ranging from 0.02 to 0.05. This low value of $\tau$ produces a region graph having very small regions. Indeed, the region graph produced by the initial segmentation is said to be "over-segmented," as the regions within the graph are typically too small to support region-based processing of the video. The graph segmentation module 322 increases the value of $\tau$ by a scale factor s for each subsequent iteration. In one embodiment, s is equal to two, although different embodiments can use different scale factors. Iteratively increasing $\tau$ produces region graphs with successively-larger super-regions, i.e., regions that are composed from smaller regions. The edges that lie upon "actual" region boundaries (e.g., between distinct objects in the frame) tend to have higher weights than the regions they connect, and therefore do not cause a merge as often as the edges lying within regions.

The graph segmentation module 322 can also use a defined minimum region size, m, when segmenting the region graphs. The minimum region size specifies the minimum number of pixels for a region, and thus influences the size of the regions and the number of regions within a graph. If the number of pixels in a region is below m, regions are merged into the region in order of increasing edge weight until m is reached. The initial value of m is 100 in one embodiment. Further, in one embodiment the minimum region size is also scaled by the scale factor s with each iteration.

Thus, the graph segmentation module 322 initially operates on the segmentation graph to produce a region graph with small regions. With each subsequent iteration, regions in the graph are merged to produce a region graph with larger regions. Through successive iterations, the graph segmentation module produces a hierarchy, or chain, of regions.

In one embodiment, the graph segmentation module 322 persistently saves the regions in the data storage 310. More particularly, the graph segmentation module 322 saves the spatio-temporal regions as frame-slices. Each frame-slice of a region is saved as a list of scanlines, each scanline containing a list of non-overlapping intervals that cover the region. The graph segmentation module 322 also persistently stores a tree structure describing the region hierarchy. The tree structure allows one to choose the segmentation at any desired granularity level. The regions within the hierarchy store only the identifiers of their children—the actual scanline representations are not duplicated. Furthermore, this hierarchy is saved only once, as opposed to for each frame.

Figure 4:
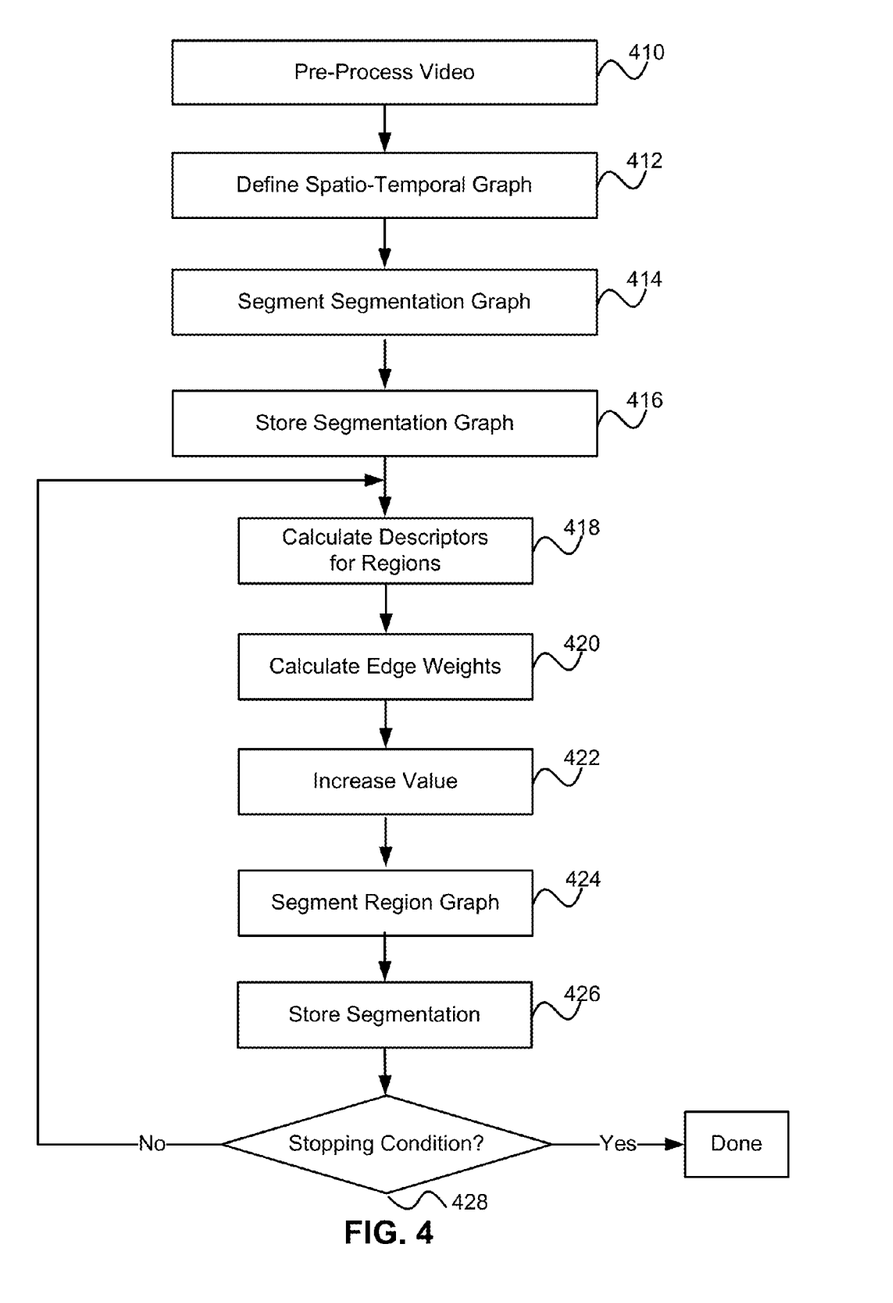
FIG. 4 is a flowchart illustrating steps performed by the segmenting server to segment a video according to one embodiment.

FIG. 4 is a flowchart illustrating steps performed by the segmenting server 112 to segment a video according to one embodiment. Other embodiments perform different steps than those shown in the figure and/or perform the steps in different orders. In addition, some or all of the steps can be performed by entities other than the segmenting server 112.

The segmenting server 112 pre-processes 410 the video. This pre-processing performs tasks such as dividing the video into different shots and filtering the frames of the video to enhance the segmentation process. After pre-processing, the segmenting server 412 defines 412 a spatio-temporal graph for the video. This defined graph is a segmentation graph, where each node of the graph corresponds to a single pixel. Each node has 26 edges connecting it to other nodes, and each edge has a weight based on the descriptors for the two nodes incident to the edge. For the segmentation graph, the descriptor for a node is the intensity of the pixel represented by the node, and the weight for an edge is the difference in pixel intensity for the two nodes incident to the edge.

The segmenting server 112 segments 414 the segmentation graph for the video to produce a region graph having nodes representing volumetric regions of the video. This segmentation is performed using a relaxed internal variation RInt(R) having a low $\tau$ value, such as 0.05, which cause the regions in the region graph to be small. The segmenting server 112 stores 416 the segmentation in the data store 310.

The segmenting server 112 calculates 418 descriptors for the regions in the region graph. To this end, the segmenting server 112 computes a histogram for each region in the graph and uses the histogram as the node's descriptor. In addition, the segmenting server 112 calculates 420 edge weights for the region graph based on the descriptors. In one embodiment, the weight for an edge is equal to the $\chi^2$ distance between the histograms of the two nodes incident to the edge.

The segmenting server 112 increases 422 the $\tau$ value by a scale factor s. Then, the segmenting server 112 segments 424 the region graph based on the nodes' internal variations, the $\tau$ value, and the edge weights, and updates the internal variations of the nodes. Due to the increased $\tau$ value, this segmentation produces a region graph having larger regions than in the prior segmentation. The segmenting server 112 saves 426 this newly-produced segmentation in the data store 310.

If 428 a stopping condition is reached, then the segmenting server 112 has completed the segmentation of the video and therefore terminates segmentation. The stopping conditions are specified by the segmenting parameters. A stopping condition can be, for example, that a specified segmentation granularity has been achieved and/or that a specified number of segmentation levels (i.e., iterations) have been performed. If 428 a stopping condition is not reached, the segmenting server 112 calculates 418 the descriptors for the regions of the current segmentation, calculates 420 edge weights based on the local descriptors, increases 422 the $\tau$ value, and performs another segmentation of the region graph. When segmentation is terminated, the segmenting server 112 and/or video server 110 can perform additional processing on the segmented video. The processing can include, for example, resizing, compressing, object detection, and image detection, and can apply different policies to different regions.

Figure 5:
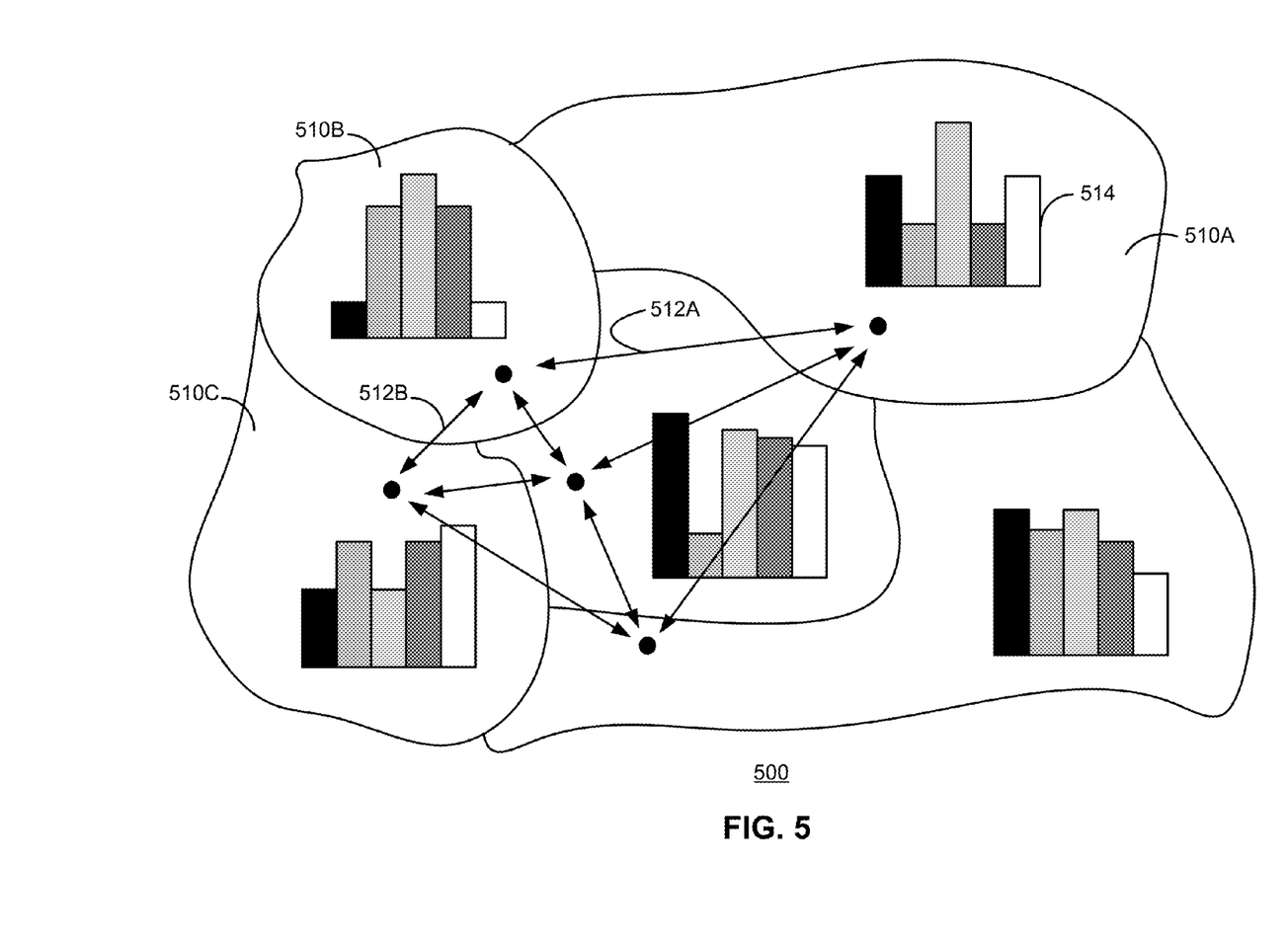
FIG. 5 illustrates an example of a region graph produced by the segmenting server.

FIG. 5 illustrates an example of a region graph 500 produced by the segmenting server 112. The graph illustrates five regions, such as regions 510A, 510B, and 510C. Each region is connected to an adjacent region via an edge, such as edges 512A and 512B. FIG. 5 also illustrates a histogram within each region, such as histogram 514, that represents the descriptor for the region.

During operation, the segmenting server 112 uses the descriptors 514 to compute the weights for the edges 512 and merges the regions 510 based in part on the weights. For example, regions 510A and 510B can be merged if the weight of edge 512A is less that the relaxed internal variation, RInt(R), of the two regions. The internal variation for a region, Int(R), is essentially the maximum edge weight of the histograms of the two or more regions that were merged in previous iterations to produce the region. The relaxed internal variation, RInt(R), in turn, is Int(R) summed with the $\tau$ value.

The above description is included to illustrate the operation of the embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method for segmenting a video, comprising:
   segmenting the video to produce video regions;
   generating a region graph for the video having weighted edges incident to video regions, the weight of an edge based on properties of video regions incident to the edge;
   determining if a weight of an edge incident to the first and second video regions is less than internal variations of the properties of the first and second video regions;
   merging a first video region and a second video region to form a merged video region responsive to a determination that the weight of the edge incident to the first and second video regions is less than internal variations of the properties of the first and second video regions; and
   storing descriptions of the region graph and the merged video region in a non-transitory computer-readable storage medium.

2. The method of claim 1, wherein segmenting the video comprises:
   analyzing the video to identify a plurality of scenes contained within the video; and
   identifying a scene of the plurality of scenes for which segmentation is to be performed.

3. The method of claim 1, wherein segmenting the video comprises:
   defining a segmentation graph for the video, wherein the segmentation graph includes a node associated with a pixel in a video frame and nodes edges incident to the node and to surrounding nodes within the video frame, to associated nodes in a previous frame, and to associated nodes in a subsequent frame; and
   segmenting the segmentation graph to produce the video regions.

4. The method of claim 1, wherein a video region comprises a plurality of pixels and wherein the properties of the video region include properties of the plurality of pixels.

5. The method of claim 1, wherein generating a region graph for the video comprises:
   calculating the weight for the edge incident to the first video region and the second video region responsive to a comparison of properties of pixels within the first and second video regions.

6. The method of claim 1, wherein merging a first video region and a second video region comprises:
   determining a scalar value representing a granularity of the video regions;
   determining a relaxed internal variation for the first video region and the second video region based on the internal variations of the properties of the first and second video regions and the determined scalar value; and
   merging the first and second video regions responsive to a determination that the weight of the edge incident to the first and second video regions is less than the relaxed internal variation.

7. The method of claim 6, wherein the video is segmented via an iterative process and wherein the scalar value increases with each iteration.

8. A system for segmenting a video, comprising:
   a processor for executing computer program instructions;
   a non-transitory computer-readable storage medium storing computer program instructions executable to:
      segment the video to produce video regions;
      generate a region graph for the video having weighted edges incident to video regions, the weight of an edge based on properties of video regions incident to the edge;
      determine if a weight of an edge incident to the first and second video regions is less than internal variations of the properties of the first and second video regions;
      merge a first video region and a second video region to form a merged video region responsive to a determination that the weight of the edge incident to the first and second video regions is less than internal variations of the properties of the first and second video regions; and
      store descriptions of the region graph and the merged video region in a memory.

9. The system of claim 8, wherein segmenting the video comprises:
   analyzing the video to identify a plurality of scenes contained within the video; and
   identifying a scene of the plurality of scenes for which segmentation is to be performed.

10. The system of claim 8, wherein segmenting the video comprises:
   defining a segmentation graph for the video, wherein the segmentation graph includes a node associated with a pixel in a video frame and nodes edges incident to the node and to surrounding nodes within the video frame, to associated nodes in a previous frame, and to associated nodes in a subsequent frame; and segmenting the segmentation graph to produce the video regions.

11. The system of claim 8, wherein a video region comprises a plurality of pixels and wherein the properties of the video region include properties of the plurality of pixels.

12. The system of claim 8, wherein generating a region graph for the video comprises:
calculating the weight for the edge incident to the first video region and the second video region responsive to a comparison of properties of pixels within the first and second video regions.

13. The system of claim 8, wherein merging a first video region and a second video region comprises:
determining a scalar value representing a granularity of the video regions;
determining a relaxed internal variation for the first video region and the second video region based on the internal variations of the properties of the first and second video regions and the determined scalar value; and
merging the first and second video regions responsive to a determination that the weight of the edge incident to the first and second video regions is less than the relaxed internal variation.

14. The system of claim 13, wherein the video is segmented via an iterative process and wherein the scalar value increases with each iteration.

15. A non-transitory computer-readable storage medium storing executable computer program instructions for segmenting a video, the instructions comprising instructions for:
segmenting the video to produce video regions;
generating a region graph for the video having weighted edges incident to video regions, the weight of an edge based on properties of video regions incident to the edge;
determining if a weight of an edge incident to the first and second video regions is less than internal variations of the properties of the first and second video regions;
merging a first video region and a second video region to form a merged video region responsive to a determination that the weight of the edge incident to the first and second video regions is less than internal variations of the properties of the first and second video regions; and
storing descriptions of the region graph and the merged video region in a memory.

16. The non-transitory computer-readable storage medium of claim 15, wherein segmenting the video comprises:
analyzing the video to identify a plurality of scenes contained within the video; and
identifying a scene of the plurality of scenes for which segmentation is to be performed.

17. The non-transitory computer-readable storage medium of claim 15, wherein segmenting the video comprises:
defining a segmentation graph for the video, wherein the segmentation graph includes a node associated with a pixel in a video frame and nodes edges incident to the node and to surrounding nodes within the video frame, to associated nodes in a previous frame, and to associated nodes in a subsequent frame; and
segmenting the segmentation graph to produce the video regions.

18. The non-transitory computer-readable storage medium of claim 15, wherein a video region comprises a plurality of pixels and wherein the properties of the video region include properties of the plurality of pixels.

19. The non-transitory computer-readable storage medium of claim 15, wherein generating a region graph for the video comprises:
calculating the weight for the edge incident to the first video region and the second video region responsive to a comparison of properties of pixels within the first and second video regions.

20. The non-transitory computer-readable storage medium of claim 15, wherein merging a first video region and a second video region comprises:
determining a scalar value representing a granularity of the video regions;
determining a relaxed internal variation for the first video region and the second video region based on the internal variations of the properties of the first and second video regions and the determined scalar value; and
merging the first and second video regions responsive to a determination that the weight of the edge incident to the first and second video regions is less than the relaxed internal variation.

* * * * *